Patented July 5, 1938

2,122,408

UNITED STATES PATENT OFFICE 2,122,408

GASOLINE ANTIOXIDANT

Hans T. Clarke, New York, and Fred R. Bean, Rochester, N. Y., assignors, by mesne assignments, to Eastman Kodak Company, Jersey City, N. J., a corporation of New Jersey No Drawing. Application June 26, 1936,
Serial No. 87,469

2 Claims. (Cl. 44—9)

This invention relates to antioxidants for gasoline, and has for its object to provide a compound which will inhibit the formation of gum in gasoline.

We have discovered that the dibutyl ester of p-hydroxyphenyliminodiacetic acid is an excellent antioxidant for preventing gum formation in gasoline.

p-Hydroxyphenyliminodiacetic acid has the structural formula

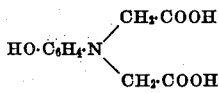

and is described by L. Galatis in Helvetica Chimica Acta 4, 574–9 (1921). Its preparation is also described in German Patent 383,190, abstracted in Chemisches Zentralblatt, vol. 24, part I, page 1592. A sodium salt of this compound can be prepared by treating with sufficient sodium hydroxide solution to neutralize the carboxyl groups, and evaporating to dryness. The dibutyl ester can be prepared from the sodium salt in the following manner:

A suspension of 500 grams of the sodium salt of p-hydroxyphenyliminodiacetic acid in 1200 cc. of butyl alcohol containing an excess of dry hydrogen chloride (2–3 molar equivalents) is heated under reflux for 15–16 hours. The sodium chloride formed is filtered off, and most of the butyl alcohol, together with the water formed in the esterification, is distilled off at atmospheric pressure. The residue is treated with a concentrated solution of sodium carbonate and distilled under reduced pressure. The product boils at 195–210° under 2–3 mm. pressure. It is a straw colored liquid which easily solidifies. The solid melts at 64–65° C., is insoluble in water, soluble in dilute aqueous alkalies and mineral acids, and soluble in practically all organic liquids.

It is generally considered that gum formation in gasoline is due to autoxidation. The tendency of a motor fuel to form gum or resinous products can be determined, among other methods, by an accelerated oxidation test. While there are various methods of carrying out such a test, the method described by Egloff, Morrell, Lowry and Dryer in Industrial & Engineering Chemistry, vol. 24, pages 1375–1378 (1932) is very satisfactory and is widely used. Briefly, the described method is as follows: A sample of the motor fuel to be tested, in an open eight-ounce bottle, is placed in a suitable metal bomb surrounded by a water bath. Oxygen is introduced to 100 pounds per square inch (7 kg. per sq. cm.) pressure. The bath is then heated by steam to 100° C. As the temperature increases the pressure rises, reaches a maximum and continues near this maximum for a shorter or longer period of time, depending upon the stability of the gasoline. The test is continued for four hours or until a break in the pressure curve is noted. The period from slightly before attainment of maximum pressure (approximately 15 minutes from the beginning of heating) until more than a slight drop in pressure takes place (usually a sharp break in the pressure curve occurs) is recorded as the induction period.

A sample of a gasoline whose induction period, when untreated, was found by the above method to be 230 minutes, was treated by dissolving in it 0.0025% by weight of the dibutyl ester of p-hydroxyphenyliminodiacetic acid. The induction period of the treated sample, tested by the same method under the same conditions, was found to be 460 minutes. Thus the increase in the induction period was 230 minutes, or a 100% increase.

While we have described the preparation and use of the dibutyl ester of p-hydroxyphenyliminodiacetic acid, it will be apparent that other lower dialkyl esters of p-hydroxyphenyliminodiacetic acid, such, for instance, as the diethyl and dipropyl esters, may also be employed as antioxidants for gasoline. They may be prepared by the same method, substituting the corresponding alcohol for butyl alcohol. It will also be apparent that the lower dialkyl esters of p-hydroxyphenyliminodiacetic acid may be used as antioxidants for substances other than gasoline which have a tendency to autoxidation; for instance, they may be used to retard rancidity in castor oil in artificial leather coatings.

The lower dialkyl esters, and specifically the dibutyl esters, of p-hydroxyphenyliminodiacetic acid, and the process of preparing them described in this application, are claimed in our copending application Serial No. 107,836, filed October 27, 1936.

What we claim as our invention and desire to be secured by Letters Patent of the United States is:

1. A composition of matter comprising a gum-forming gasoline and a lower dialkyl ester of p-hydroxyphenyliminodiacetic acid in quantity sufficient to appreciably retard the gum formation of the gasoline.

2. A composition of matter comprising a gum-forming gasoline and the dibutyl ester of p-hydroxyphenyliminodiacetic acid in quantity sufficient to appreciably retard the gum formation of the gasoline.

HANS T. CLARKE.
FRED R. BEAN.